(12) United States Patent
Akaza et al.

(10) Patent No.: US 11,478,710 B2
(45) Date of Patent: Oct. 25, 2022

(54) INFORMATION PROCESSING DEVICE, METHOD AND MEDIUM

(71) Applicant: SQUARE ENIX CO., LTD., Tokyo (JP)

(72) Inventors: Kiyotaka Akaza, Tokyo (JP); Yosuke Hayashi, Tokyo (JP); Kei Odagiri, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 59 days.

(21) Appl. No.: 17/016,215

(22) Filed: Sep. 9, 2020

(65) Prior Publication Data
US 2021/0077906 A1    Mar. 18, 2021

(30) Foreign Application Priority Data
Sep. 13, 2019   (JP) .............................. JP2019-167497

(51) Int. Cl.
*A63F 13/67*     (2014.01)
*G06F 3/16*      (2006.01)
(Continued)

(52) U.S. Cl.
CPC .............. *A63F 13/67* (2014.09); *A63F 13/35* (2014.09); *A63F 13/814* (2014.09); *G06F 3/165* (2013.01); *H04L 67/10* (2013.01)

(58) Field of Classification Search
CPC ......... G06F 3/167; G06F 3/165; H04L 67/10; A63F 13/67; A63F 13/35; A63F 13/814
See application file for complete search history.

(56) References Cited

U.S. PATENT DOCUMENTS 5,704,007 A * 12/1997 Cecys ..................... G10L 13/04
                                                        704/258
5,864,812 A * 1/1999 Kamai ................... G10L 13/02
                                                        704/268
(Continued)

FOREIGN PATENT DOCUMENTS

JP      2002099274 A     4/2002
JP      2004093975 A     3/2004
(Continued)

OTHER PUBLICATIONS

Notice of Reasons for Rejection for Japanese Application No. 2019-167497, dated May 11, 2021 with English translation; pp. all.
(Continued)

*Primary Examiner* — Steve Rowland
(74) *Attorney, Agent, or Firm* — Dorsey & Whitney LLP (57) ABSTRACT

A computer functions as: an individual performance data receiver that receives a plurality of pieces of individual performance data from two or more performer user terminals connected via a network, each of the pieces of individual performance data being generated in accordance with a performance operation by a user on the corresponding performer user terminal and transmitted during a performance; a synthetic performance data generator that generates synthetic performance data by synthesizing pieces of individual performance data in an identical time slot, of the plurality of pieces of individual performance data received from the performer user terminals, during the performance, the synthetic performance data being used to reproduce sound in which individual performance contents on the two or more performer user terminals are mixed; and a synthetic performance data transmitter that transmits the synthetic performance data to at least one appreciator user terminal connected via the network during the performance.

17 Claims, 8 Drawing Sheets

(51) Int. Cl.
*A63F 13/35* (2014.01)
*A63F 13/814* (2014.01)
*H04L 67/10* (2022.01)

(56) References Cited

U.S. PATENT DOCUMENTS

| | | | | |
|---|---|---|---|---|
| 7,454,348 | B1* | 11/2008 | Kapilow | G10L 13/033 |
| | | | | 704/258 |
| 8,147,337 | B2 | 4/2012 | Kitamura et al. | |
| 8,246,460 | B2 | 8/2012 | Kitahara | |
| 8,682,653 | B2* | 3/2014 | Salazar | G10H 1/366 |
| | | | | 704/207 |
| 10,438,448 | B2* | 10/2019 | Piccionielli | G07F 17/3272 |
| 11,074,923 | B2* | 7/2021 | Cook | G10L 21/013 |
| 2006/0173676 | A1* | 8/2006 | Kemmochi | G10L 13/06 |
| | | | | 704/207 |
| 2006/0195869 | A1 | 8/2006 | Holm et al. | |
| 2007/0039449 | A1* | 2/2007 | Redmann | G10H 1/0058 |
| | | | | 84/609 |
| 2010/0281271 | A1* | 11/2010 | Komano | G10H 1/0041 |
| | | | | 713/189 |
| 2011/0316817 | A1 | 12/2011 | Yamada et al. | |
| 2014/0039883 | A1* | 2/2014 | Yang | G10H 1/366 |
| | | | | 704/207 |
| 2017/0272480 | A1* | 9/2017 | Sasaki | G06F 21/31 |
| 2018/0233147 | A1* | 8/2018 | Tukka | G06F 3/167 |
| 2019/0266987 | A1* | 8/2019 | Yang | G10H 1/365 |
| 2019/0355336 | A1* | 11/2019 | Steinwedel | G10H 1/368 |

FOREIGN PATENT DOCUMENTS

| | | | |
|---|---|---|---|
| JP | 2005250148 | A | 9/2005 |
| JP | 2007041320 | A | 2/2007 |
| JP | 2008113766 | A | 5/2008 |
| JP | 2008304821 | A | 12/2008 |
| JP | 4700351 | B2 | 3/2011 |
| JP | 5094091 | B2 | 9/2012 |
| JP | 5420833 | B2 | 11/2013 |
| JP | 2014150938 | A | 8/2014 |
| JP | 2014151027 | A | 8/2014 |
| JP | 2015070460 | A | 4/2015 |
| JP | 2016192987 | A | 11/2016 |
| JP | 6130041 | B1 | 4/2017 |
| JP | 2018078975 | A | 5/2018 |
| WO | 2010079649 | A1 | 7/2010 |
| WO | 2013168547 | A1 | 11/2013 |

OTHER PUBLICATIONS

First Examination Report for Indian Application No. 202044039345, dated May 12, 2021 with English translation; pp. all.

* cited by examiner

INFORMATION PROCESSING DEVICE, METHOD AND MEDIUM

CROSS-REFERENCE TO RELATED APPLICATION (S)

This application is based upon and claims the benefit of priority of the prior Japanese Patent Application No. 2019-167497, filed on Sep. 13, 2019, the disclosure of which is expressly incorporated herein by reference in its entirety.

FIELD OF THE INVENTION

The present disclosure relates to a technique for transmitting and receiving performance data via a network.

BACKGROUND

There are proposed various techniques for playing back a combination of the results of performing music provided by a plurality of users in a computer game in which the users participate. Examples of apparatuses, systems, and programs may be found in Japanese Patent No. 6130041, Japanese Patent No. 5420833, and Japanese Patent No. 5094091.

Further, there is proposed a multi-user system for bidirectionally controlling the actions of participant. Examples of systems may be found in Japanese Patent No. 4700351. The multi-user system includes a first device to be operated by a first user so as to dynamically control the actions of the participants in an environment, and a second device to be simultaneously operated by a second user so as to dynamically change the environment.

SUMMARY

There is a system in which data of music performed by a user is transmitted via a network, such as a computer game that has a function of allowing a user to perform music through operation of a character. However, in a system in which a plurality of users participate at the same time, when performance data is transmitted and received via a network that causes a delay that may hinder the ensemble performance, it is difficult for the plurality of users to play in the ensemble in synchronized timing in real time.

An object of at least one embodiment of the present disclosure is to solve the above problem and reduce the deviation in an ensemble caused by data transmission on the network.

According to a non-limiting aspect, one aspect of the present disclosure is a program for causing a computer to function as: an individual performance data receiver configured to receive a plurality of pieces of individual performance data from two or more performer user terminals connected via a network, each of the pieces of individual performance data being generated in accordance with a performance operation by a user on the corresponding performer user terminal and transmitted during a performance; a synthetic performance data generator configured to generate synthetic performance data by synthesizing pieces of individual performance data in an identical time slot, of the plurality of pieces of individual performance data received from the performer user terminals, during the performance, the synthetic performance data being used to reproduce sound in which individual performance contents on the two or more performer user terminals are mixed; and a synthetic performance data transmitter configured to transmit the synthetic performance data to at least one appreciator user connected via the network during the performance.

Note that the present disclosure can be regarded as an information processing device, an information processing system, a method performed by a computer, or a program executed by the computer. Further, the present disclosure can be grasped as a recording medium in which such a program is recorded to be readable by a computer or other device, machine, or the like. Here, the recording medium to be readable by the computer and the like is a recording medium that stores information such as data and programs in electrical, magnetic, optical, mechanical, or chemical form and can be read by the computer or the like.

Embodiments in the present application will solve one or more defects.

DESCRIPTION OF EMBODIMENTS

Hereinafter, embodiments of the present disclosure will be described with reference to the drawings. Note that each of the embodiments described below is an example in which the present disclosure is implemented, and does not limit the present disclosure to a specific configuration as described below. In implementing the present disclosure, a specific configuration according to the embodiment may be adopted as appropriate.

First Embodiment

Configuration of Device

Figure 1:
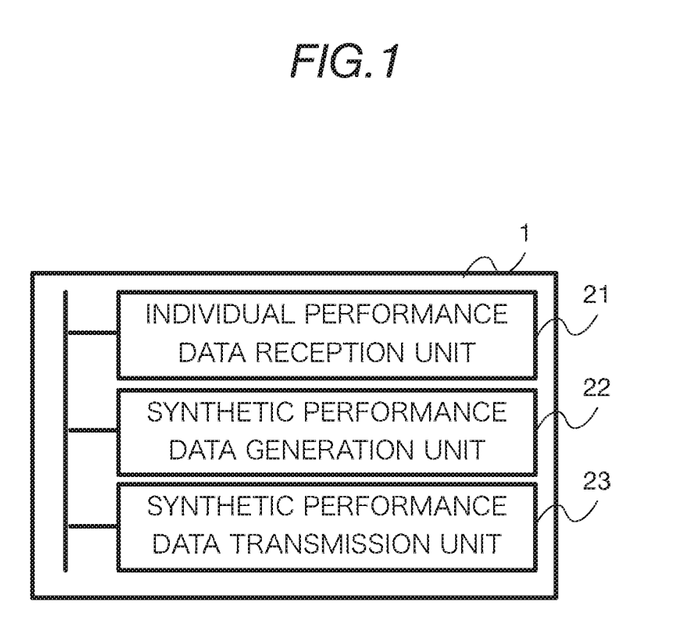
FIG. 1 is a schematic diagram of a functional configuration of an information processing device according to at least one of the embodiments of the present disclosure.

FIG. 1 is a schematic diagram of a functional configuration of an information processing device 1 according to the present embodiment. In the information processing device 1 according to the present embodiment, a processor interprets and executes various programs loaded into various memories to function as an information processing device that includes an individual performance data reception unit 21, a synthetic performance data generation unit 22, and a synthetic performance data transmission unit 23. In the present embodiment, an example will be described in which all of the functions of the units are executed by a general-purpose processor, but some or all of the functions may be implemented by one or more dedicated processors. Further, each of the functional units included in the information processing device 1 may be installed on, for example, a cloud. Further, such functional units may be implemented by a plurality of software modules instead of a single software module.

The individual performance data reception unit 21 receives, from two or more performer user terminals 3 connected via a network, a plurality of pieces of individual performance data that are each generated in accordance with a performance operation by a user on the corresponding performer user terminal and transmitted during a performance.

The synthetic performance data generation unit 22 generates synthetic performance data used to reproduce sound in which individual performance contents on the two or more performer user terminals are mixed by synthesizing pieces of individual performance data in an identical time slot, of the plurality of pieces of individual performance data received from the performer user terminals, during the performance.

The synthetic performance data transmission unit 23 transmits the synthetic performance data to at least one appreciator user terminal connected via the network during the performance.

Flow of Processing

Next, the flow of processing to be executed in the present embodiment will be described. Note that specific contents and processing order of the processing illustrated in flowcharts according to the embodiment are examples for implementing the present disclosure. The specific processing contents and processing order may be selected as appropriate for the embodiment of the present disclosure.

Figure 2:
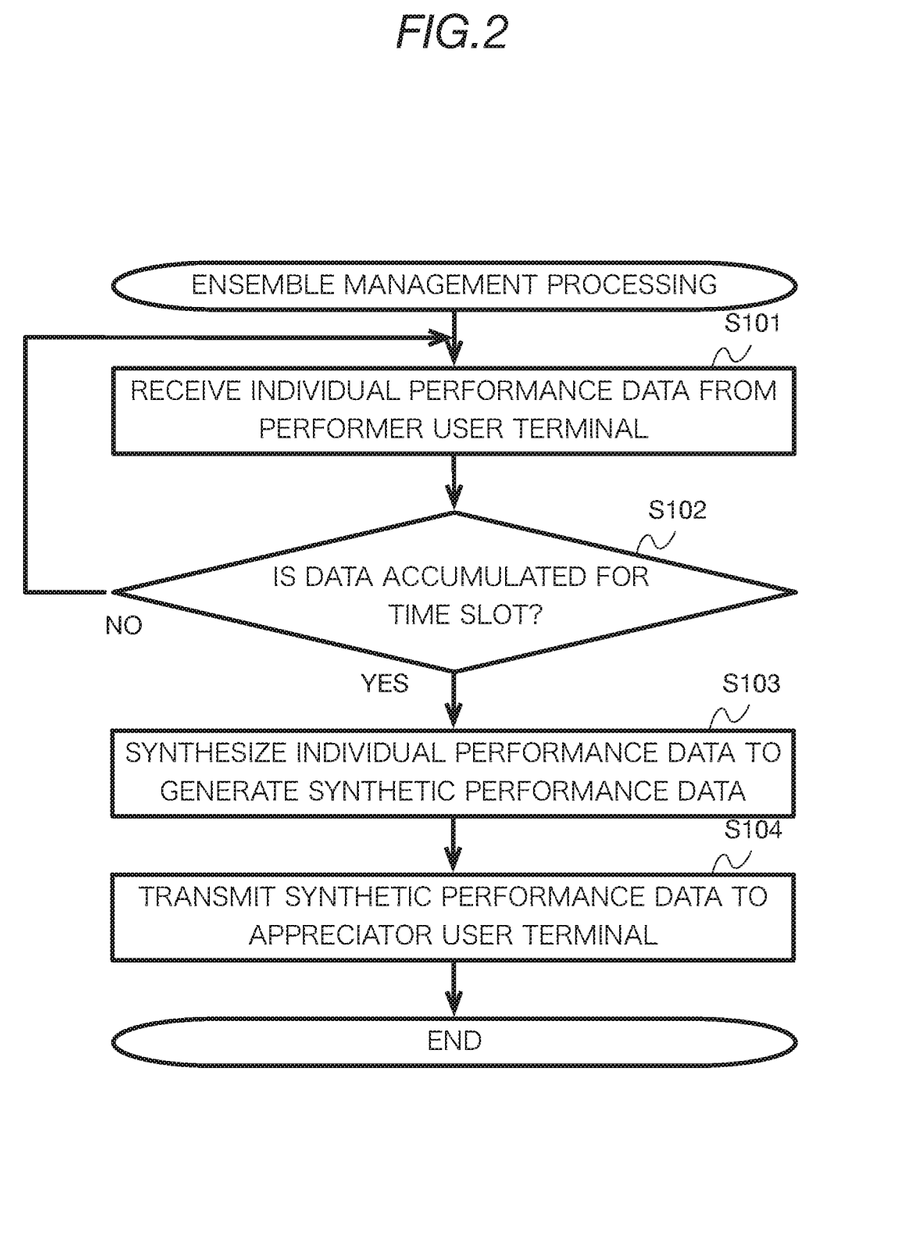
FIG. 2 is a flowchart illustrating a flow of ensemble management processing according to at least one of the embodiments of the present disclosure.

FIG. 2 is a flowchart illustrating a flow of ensemble management processing according to the first embodiment. The processing illustrated in the flowchart is triggered by the start of an ensemble by a plurality of user terminals, and then repeatedly performed in the information processing device 1 in parallel with processing of managing a game in which a plurality of user terminals participate.

The individual performance data reception unit 21 receives, from two or more performer user terminals connected via a network, a plurality of pieces of individual performance data that are each generated in accordance with a performance operation by a user on the corresponding performer user terminal and transmitted during a performance (step S101). At this time, the synthetic performance data generation unit 22 has a buffer that is ready to receive pieces of individual performance data from the performer user terminals for at least a predetermined number of time slots, and accumulates therein pieces of individual performance data corresponding to the predetermined number of time slots (step S102). Note that a suitable unit for the time slot may be adopted as appropriate for the embodiment. For example, the length of the time slot may be a time length corresponding to one bar (i.e., a different length depending on set beats per minute (BPM), so-called tempo), may be a fixed predetermined time length (e.g., 0.1 seconds), or may be a time length dynamically changing depending on the load of a server or network condition.

The synthetic performance data generation unit 22 generates synthetic performance data used to reproduce sound in which individual performance contents on the two or more performer user terminals are mixed by synthesizing pieces of individual performance data in an identical time slot, of the plurality of pieces of individual performance data received from the performer user terminals, during the performance (step S103). Then, the synthetic performance data transmission unit 23 transmits the synthetic performance data to at least one appreciator user terminal connected via the network during the performance (step S104). In the ensemble management processing according to the present embodiment, the processing of steps S101 to S104 are repeatedly performed.

In the information processing device 1 according to the present embodiment, the synthetic performance data, which is generated by synthesizing the pieces of individual performance data generated by the plurality of performer user terminals, is transmitted to the appreciator user terminal. This makes it possible to suppress the deviation of the timing when each piece of performance data arrives at the appreciator user terminal and thus reduce the deviation in the ensemble due to the data transmission on the network.

Second Embodiment

Next, a second embodiment will be described. The same configuration and processing contents as those of the first embodiment will be referred to the first embodiment, and the description thereof will be omitted.

Configuration of Device

The information processing device 1 according to the present embodiment is the same as the information processing device 1 described in the first embodiment with reference to FIG. 1 in that it includes the individual performance data reception unit 21, the synthetic performance data generation unit 22, and the synthetic performance data transmission unit 23. However, in the present embodiment, the contents of the processing by the individual performance data reception unit 21 and the synthetic performance data generation unit 22 are different from the contents of the processing described in the first embodiment.

In the second embodiment, the individual performance data reception unit 21 receives individual performance data including timing information for identifying a timing determined based on counting with a metronome operating in each of the performer user terminals.

Further, in the second embodiment, the synthetic performance data generation unit 22 synthesizes pieces of individual performance data in an identical time slot based on the timing information to generate synthetic performance data.

Flow of Processing

Next, the flow of processing to be executed in the present embodiment will be described. Note that specific contents and processing order of the processing illustrated in flowcharts according to the embodiment are examples for implementing the present disclosure. The specific processing contents and processing order may be selected as appropriate for the embodiment of the present disclosure.

Figure 3:
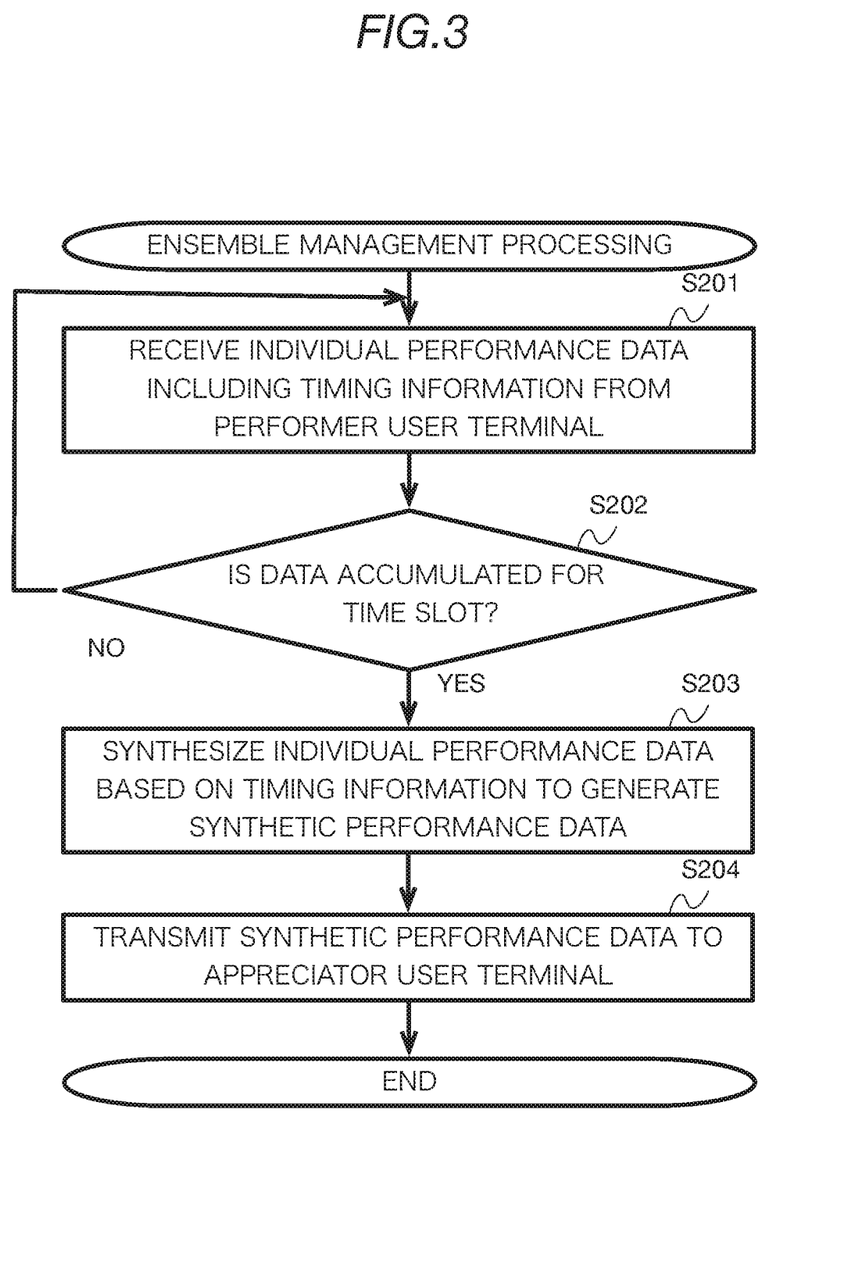
FIG. 3 is a flowchart illustrating a flow of ensemble management processing according to at least one of the embodiments of the present disclosure.

FIG. 3 is a flowchart illustrating a flow of ensemble management processing according to the second embodiment. The processing illustrated in the flowchart is triggered by the start of an ensemble by a plurality of user terminals, and then repeatedly performed in the information processing device 1 in parallel with processing of managing a game in which a plurality of user s participate.

The individual performance data reception unit 21 receives, from two or more performer user terminals connected via a network, a plurality of pieces of individual performance data that are each generated in accordance with a performance operation by a user on the corresponding performer user terminal and transmitted during a performance S201). The individual performance data received here includes timing information for identifying a timing determined based on counting with the metronome operating in each of the performer user terminals. Further, the synthetic performance data generation unit 22 has a buffer that is ready to receive pieces of individual performance data from the performer user terminals for at least a predetermined number of time slots (see the first embodiment), and accumulates therein pieces of individual performance data corresponding to the predetermined number of time slots (step S202).

The synthetic performance data generation unit 22 generates synthetic performance data used to reproduce sound in which individual performance contents on the two or more performer user terminals are mixed by synthesizing, based on the timing information, pieces of individual performance data in an identical time slot, of the plurality of pieces of individual performance data received from the performer user terminals, during the performance (step S203). Then, the synthetic performance data transmission unit 23 transmits the synthetic performance data to at least one appreciator user terminal connected via the network during the performance (step S204). In the ensemble management processing according to the present embodiment, the processing of steps S201 to S204 are repeatedly performed.

In the information processing device 1 according to the present embodiment, the synthetic performance data is generated based on the timing information determined by counting with the metronome operating in each of the performer user terminals. Accordingly, it is possible to suppress the deviation of the timing at which the individual performance data arrives at the information processing device 1, and thus further reduce the deviation in the ensemble due to the data transmission on the network.

Third Embodiment

Configuration of Device

Figure 4:
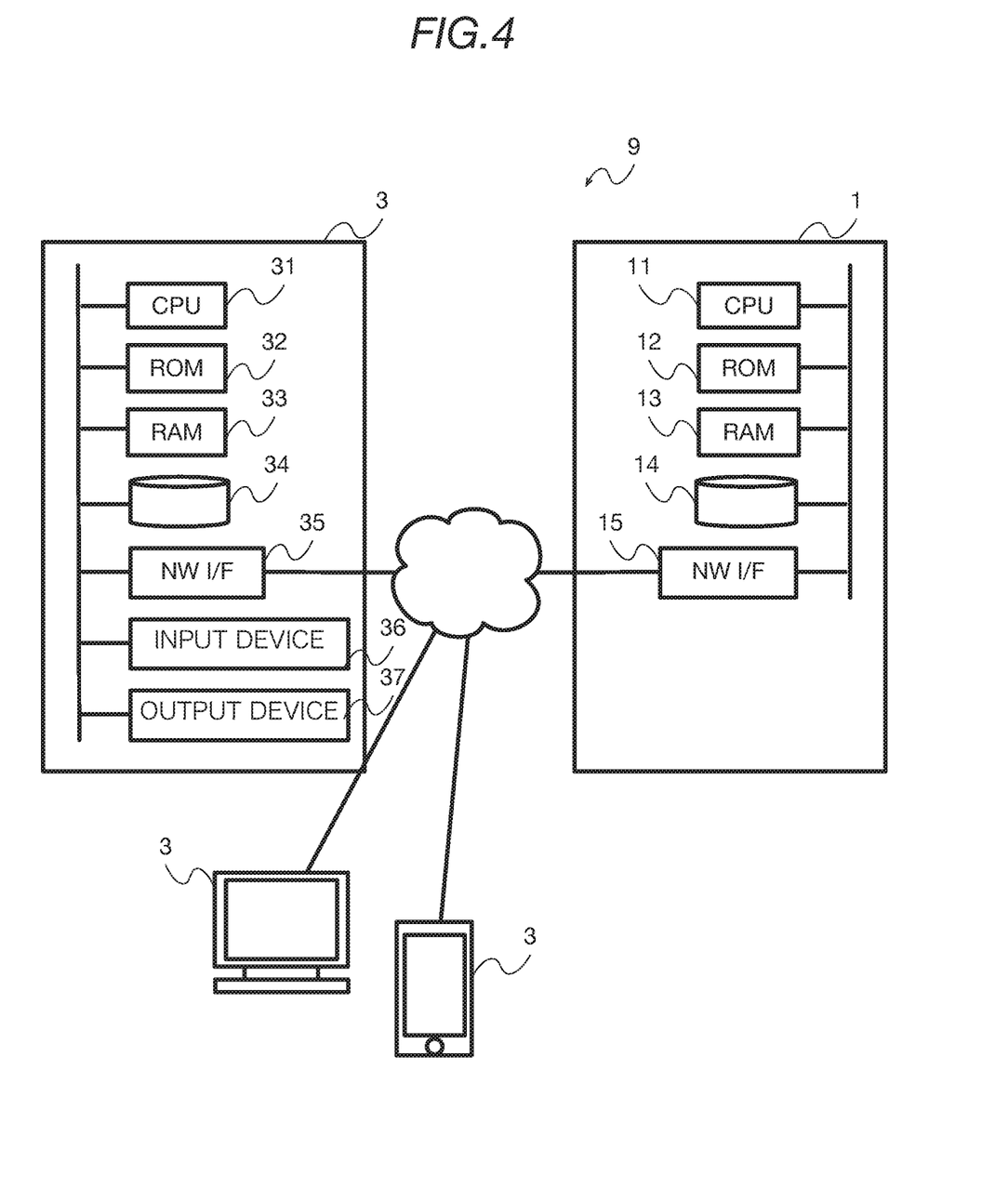
FIG. 4 is a schematic diagram of a configuration of an information processing system according to at least one of the embodiments of the present disclosure.

FIG. 4 is a schematic diagram of a configuration of an information processing system 9 according to the present embodiment. The information processing system 9 according to the present embodiment includes an information processing device 1 and a plurality of user terminals 3, which are connected to a network such as the Internet. The information processing device 1 is a server 1 for a game in which the plurality of user terminals 3 participate. The game played in the plurality of user terminals 3 connecting to the server 1 is, for example, a massively multiplayer online role-playing game (MMORPG), but the game to which the technique according to the present disclosure is applicable is not limited to the example in the present embodiment, and may be any game as long as it is playable on two or more user terminals 3 connected via a network. Further, the user terminal 3 is a game device or the like used by a user. As the game device, various types of devices can be used such as a personal computer, a smartphone, a handheld game console, a home video game console, a wearable electronic device e.g., a virtual reality (VR) headset, a smart watch, etc.), but the types are not limited. The user can play the game by causing the user terminal 3 and the information processing device 1 to execute game processing based on a game processing program.

The information processing device 1 is an information processing device in which a central processing unit (CPU) 11, a read only memory (ROM) 12, a random access memory (RAM) 13, an auxiliary storage device 14, and a network interface 15 for communicating with an external device are connected by wire or wirelessly. Note that one or some of the components of the specific hardware configuration of the information processing device 1 may be removed or replaced, or the configuration may include one or more additional components, as appropriate for the embodiment.

The CPU 11 controls the components included in the information processing device 1, such as the RAM 13 and the auxiliary storage device 14 by processing instructions and data loaded into the ROM 12, the RAM 13, or the like. The RAM 13 is a main storage device to and from which various instructions and data are written and read by the CPU 11 controlling it. In other words, the CPU 11, the ROM 12, and the RAM 13 constitute a control unit of the information processing device 1.

The auxiliary storage device 14 is a non-volatile storage device to and from which various data used by the information processing device 1 are written and read as well as information to be retained even after the information processing device 1 is powered oil; for example, the operating system (OS) of the information processing device 1 loaded into the RAM 13 and various programs for executing processing described below. As the auxiliary storage device 14, for example, an electrically erasable programmable ROM (EEPROM), a hard disk drive (HDD), or the like can be used.

The user terminal 3 is an information processing device in which a CPU 31, a ROM 32, a RAM 33, an auxiliary storage device 34, a network interface 35, an input device 36, and an output device 37 are connected by wire or wirelessly. Note that one or some of the components of the specific hardware configuration of the user terminal 3 may be removed or replaced, or the configuration may include one or more additional components, as appropriate for the embodiment.

As the input device 36, various devices can be adopted such as a button, a stick, a keyboard, a mouse, a trackball, a touch sensor, an acceleration sensor, an angular velocity sensor, a camera, a depth sensor, and a microphone. As the output device 37, various devices can be adopted such as a display, a speaker, a vibrator, and an LED. Further, a display with a touch panel may be adopted so that the input device 36 and the output device 37 for displaying an image are provided together.

Further, as the auxiliary storage device 34 of the user terminal 3, a detachable portable medium may be used as well as those described by way of examples of the auxiliary storage device 14 of the information processing device 1. Examples of the portable medium include a card/cartridge type medium including a ROM and the like, a compact disc (CD), a digital versatile disc (DVD), and a Blu-ray (registered trademark) disc (BD). An auxiliary storage device provided as a portable medium and a non-portable auxiliary storage device can be used in combination.

Figure 5:
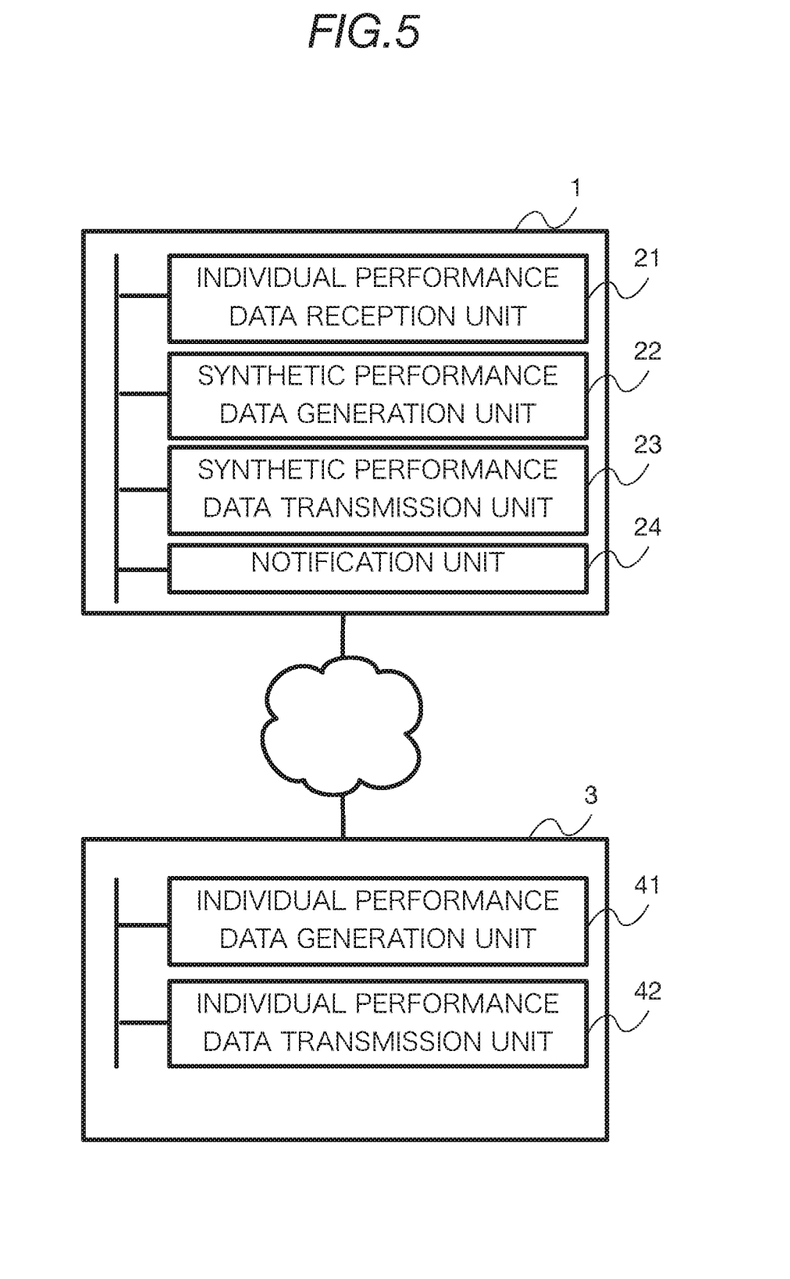
FIG. 5 is a schematic diagram of a functional configuration of the information processing system according to at least one of the embodiments of the present disclosure.

FIG. 5 is a schematic diagram of a functional configuration of an information processing system 9 according to the present embodiment. In the information processing device 1 according to the present embodiment, the CPU 11 interprets and executes various programs loaded into the ROM 12, the RAM 13, and the like to function as a server 1 that includes an individual performance data reception unit 21, a synthetic performance data generation unit 22, a synthetic performance data transmission unit 23, and a notification unit 24. In the present embodiment, an example will be described in which all of the functions of the units are executed by the general-purpose CPU 11, but some or all of the functions may be implemented by one or more dedicated processors. Further, each of the functional units included in the information processing device 1 may be installed on, for example, a cloud. Further, such functional units may be implemented by a plurality of software modules instead of a single software module.

Further, in the user terminal 3 according to the present embodiment, the CPU 31 interprets and executes various programs loaded into the ROM 32, the RAM 33, and the like to function as a user terminal 3 that includes an individual performance data generation unit 41 and an individual performance data transmission unit 42. In the present embodiment, an example will be described in which all of the functions of the units are executed by the general-purpose CPU 31, but some or all of the functions may be implemented by one or more dedicated processors. Further, each of the functional units included in the user terminal 3 may be installed on, for example, a cloud. Further, such functional units may be implemented by a plurality of software modules instead of a single software module.

The individual performance data generation unit 41 of the user terminal 3 generates a plurality of pieces of individual performance data in accordance with a performance operation by the user.

The individual performance data transmission unit 42 of the user terminal 3 transmits the individual performance data to the server 1 during the performance.

The notification unit 24 of the server 1 notifies each of the performer user terminals 3 of ensemble environment information for setting the metronome operating in each of the performer user terminals 3.

The individual performance data reception unit 21 of the server 1 receives, from two or more performer user terminals 3 connected via a network, a plurality of pieces of individual performance data that are each generated in accordance with a performance operation by a user on the corresponding performer user terminal 3 and transmitted during the performance. At this time, the individual performance data reception unit 21 receives each piece of individual performance data along with timing information for identifying a timing determined based on counting with the metronome operating in the corresponding performer user terminal 3.

The synthetic performance data generation unit 22 of the server 1 generates synthetic performance data used to reproduce sound in which individual performance contents on the two or more performer user terminals 3 are mixed by synthesizing pieces of individual performance data in an identical time slot, of the plurality of pieces of individual performance data received from two or more performer user terminals 3 included in a party created in advance, during the performance.

The synthetic performance data transmission unit 23 of the server 1 transmits the synthetic performance data to at least one appreciator user terminal 3 connected via the network during the performance.

Flow of Processing

Next, the flow of processing to be executed in the present embodiment will be described. Note that specific contents and processing order of the processing illustrated in flowcharts according to the embodiment are examples for implementing the present disclosure. The specific processing contents and processing order may be selected as appropriate for the embodiment of the present disclosure.

Figure 6:
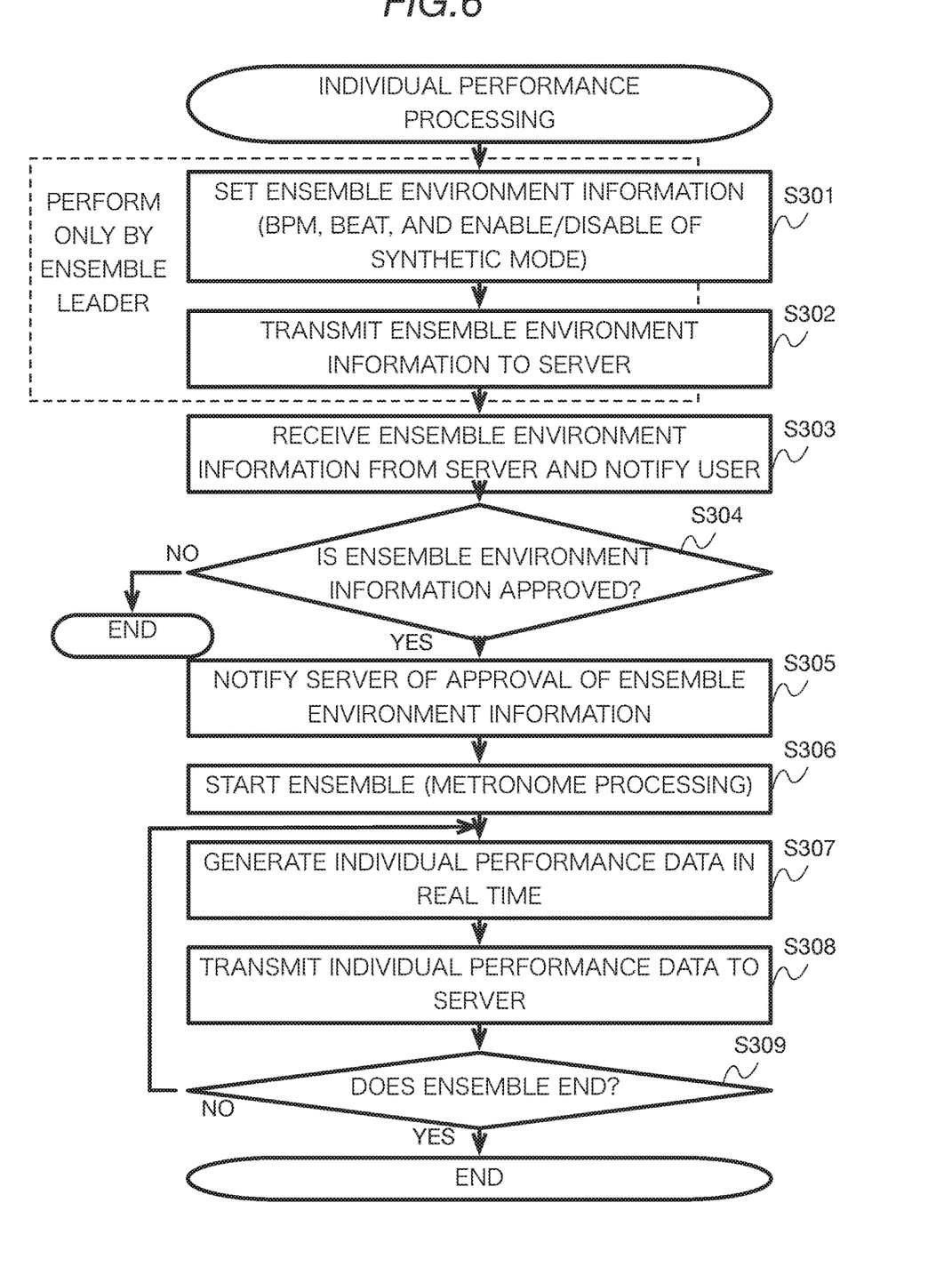
FIG. 6 is a flowchart illustrating a flow of individual performance processing according to at least one of the embodiments of the present disclosure.

FIG. 6 is a flowchart illustrating a flow of individual performance processing according to the third embodiment. The processing illustrated in the flowchart is triggered by the start of setting an ensemble in the game, and then repeatedly performed in the user terminal 3 in parallel with processing of the game.

In any of the user terminals 3 belonging to the in-game party created in advance, the user terminal 3 displays an ensemble setting panel on a game screen in response to the user, who operates a player character who is ready for playing a musical instrument in the game, operating an ensemble setting button displayed on the game screen (by clicking or tapping).

Here, the in-game party is a group of player characters that is created for a battle or the like in the game. As a method of organizing the party, a similar conventional method may be adopted, and thus the description thereof will be omitted. Further, the player character who is ready for playing a musical instrument in the game is, but depending on the specifications of the game, for example, a player character who has the skill to play the musical instrument and is currently holding the musical instrument. In the game according to the present embodiment, when the player performs an operation for causing the character to hold the musical instrument while operating the character having the skill to play the musical instrument, the player character holds the predetermined musical instrument (the musical instrument type can be selected), and then a performance interface (an interface that allows the player to specify the pitch of the keyboard, etc., which is hereinafter referred to as a "performance panel") and an ensemble setting button (e.g., an icon imitating a metronome) are displayed.

In steps S301 and S302, settings for an ensemble are performed. On the ensemble setting panel, an interface for setting BPM and BEAT (beats per bar, a so-called beat) and an interface for setting the synthetic mode to be enabled/disabled are displayed. The user can enter numerical values for the BPM and BEAT and specify the synthetic mode to be enabled/disabled on the panel (step S301).

Here, the synthetic mode a mode for performing processing of synthesizing pieces of individual performance data (synthetic performance data generation processing) in the server 1 when a plurality of player characters performs a music at the same time. Even when the synthetic mode is not enabled, a plurality of player characters can perform sic at the same time. However, if the synthetic mode is not enabled, individual performance packets generated in real time in the respective performer user terminals 3 arrive at the appreciator user terminal 3 independently. Since the transmission time of each packet is not constant, there is a possibility that the timing of the ensemble reproduced by the appreciator user terminal 3 will not match. Enabling the synthetic mode allows the server 1 to perform the processing of synthesizing pieces of individual performance data (synthetic performance data generation processing), which makes it possible to appreciate the music performance by a plurality of player characters with better synchronized timing in the appreciator user terminal 3.

When BPM and BEAT are specified on the ensemble setting panel and the synthetic mode is set to be enabled, the user terminal 3 transmits information (BPM, BEAT, enable/disable of synthetic mode, etc., which is hereinafter simply referred to the "ensemble environment information") for various environmental settings including a metronome for ensemble to the server 1 (step S302). Then, the processing proceeds to step S303.

Note that the processing of steps S301 and S302 may be performed only by one performer user terminal 3 (hereinafter, referred to as the "ensemble leader") that sets the ensemble environment information among the plurality of performer user terminals 3 that perform the ensemble, while the processing of steps S301 and S302 is skipped in the other one or more performer user terminals 3 participating in the ensemble. On the other hand, the processing of step S303 and the subsequent steps, which will be described below, is performed by all the in-party terminals (performer user terminals 3) that are ready for performing a musical instrument at the time when a notification of step S303 is transmitted from the server 1, regardless of whether or not the terminal is the ensemble leader.

In steps S303 to S306, environment setting for the ensemble is performed and the ensemble is started. The user terminal 3 receives the ensemble environment information transmitted from the server 1, and displays the content on the game screen to notify the user of the content of the ensemble environment information (step S303). The user, when receiving the notification, can select whether or not to approve the notified ensemble environment information by performing an operation of deciding whether or not to approve the content notified as the ensemble environment information (hereinafter referred to as the "ensemble ready check"). Further, when the notified ensemble environment information includes a setting for enabling the synthetic mode, the user can select whether or not to participate in the synthetic mode by approving or not approving the ensemble ready check.

When the user performs an operation of not approving the ensemble ready check (NO in step S304), the processing illustrated in the present flowchart ends, and accordingly, the player character operated on the user terminal 3 and the player do not participate in the notified ensemble. However, the player character operated on the user terminal 3 and the player may individually perform the musical instrument through the performance panel even without participating in the ensemble.

On the other hand, when the user performs an operation of approving the ensemble ready check (YES in step S304), the performer user terminal 3 on which the operation is performed sets various environmental settings including the metronome for the ensemble according to the ensemble environment information, and then notifies the server 1 of approval of the ensemble ready check (step S305). After that, the performer user terminal 3 counts down to the ensemble having a preset content (e.g., counting for two bars), and starts metronome processing for the ensemble (step S306). After that, the processing proceeds to step S307.

When the ensemble is started, the user 3 uses the metronome that operates according to the set BPM and BEAT to notify the user of a performance timing guidance until the ensemble ends. The content to be notified includes the current BPM, the current BEAT, timing of beat, head of bar, the number of bars, etc., and all of them are notified by images and/or audio. Specifically, the beat timing may be notified only by an image of the metronome, may be notified by a click sound of the metronome, or may be notified by both the image and the click sound. Further, it is preferable that the countdown and metronome processing be synchronized among the plurality of performer user terminals 3 by using the in-game time or the like. However, such synchronization may be omitted.

In steps S307 to S309, individual performance data is generated and transmitted. The individual performance data generation unit 41 of the user terminal 3 receives a performance operation from the user via the performance panel or other interface (e.g., a device for inputting a performance signal, such as a keyboard or MIDI), and generates individual performance data for identifying the content of the received performance operation (pitch, volume of sound, length of sound, timing, tone, etc.) in real time (step S307). Then, the individual performance data transmission unit 42 of the user terminal 3 transmits an individual performance packet including the generated individual performance data to the server 1 (step S308).

Here, the timing information is information for identifying an elapsed time from the start of the ensemble (metronome processing), that is, a timing at which the sound should be output in the ensemble, is identified by, for example, a combination of the bar number and the number of beats in the bar. However, the method of expressing the timing information is not limited to the example in the present embodiment. For example, the timing may be identified by a combination of the bar number and the elapsed time within the bar, or may be identified by the elapsed time from the start of the ensemble.

In the present embodiment, an example will be described in which an individual performance packet is transmitted in real time each time individual performance data is generated (e.g., each time the keyboard is pressed). However, a certain amount of individual performance data may be accumulated for a certain period of time (e.g., for one bar) and then collectively transmitted. However, since the information processing system 9 according to the present embodiment aims to cause a plurality of player characters to gather in a game field to play in an ensemble and appreciate the ensemble at the same time (in real time), a shorter delay time is preferable. In the information processing system 9 according to the present embodiment, the performance data is basically generated in real time (although there is a delay), transmitted to the server 1, and distributed from the server 1, while for example processing of transmitting or distributing the performance data in a lump is not performed.

When a predetermined end condition (e.g., an input of a user's instruction to leave the ensemble, or after a certain duration without an input of a user's performance operation) is satisfied during the generation and transmission of the individual performance data (YES in step S309), the ensemble ends, and then the processing illustrated in the present flowchart ends. On the other hand, when the predetermined end condition is not satisfied (NO in step S309), the processing of steps S307 and S308 (receiving a performance operation and transmitting individual performance data (individual performance packet)) is repeatedly performed until the ensemble ends.

Note that a feedback to a performance operation when the user performs the performance operation can be performed locally by a method in which sound corresponding to the performance operation is output, but the sound output as the feedback may be disabled. Further, instead of the feedback using the sound output, a feedback using an it mage may be performed. For example, the feedback using the image can be performed by a method of displaying a circle representing the volume of the sound corresponding to the performance operation on the player character's head or a method of displaying an equalizer of the sound corresponding to the performance operation. The feedback using the image makes it possible for the user to obtain the feedback that the user has performed the performance operation even when the feedback using the sound output is disabled.

Figure 7:
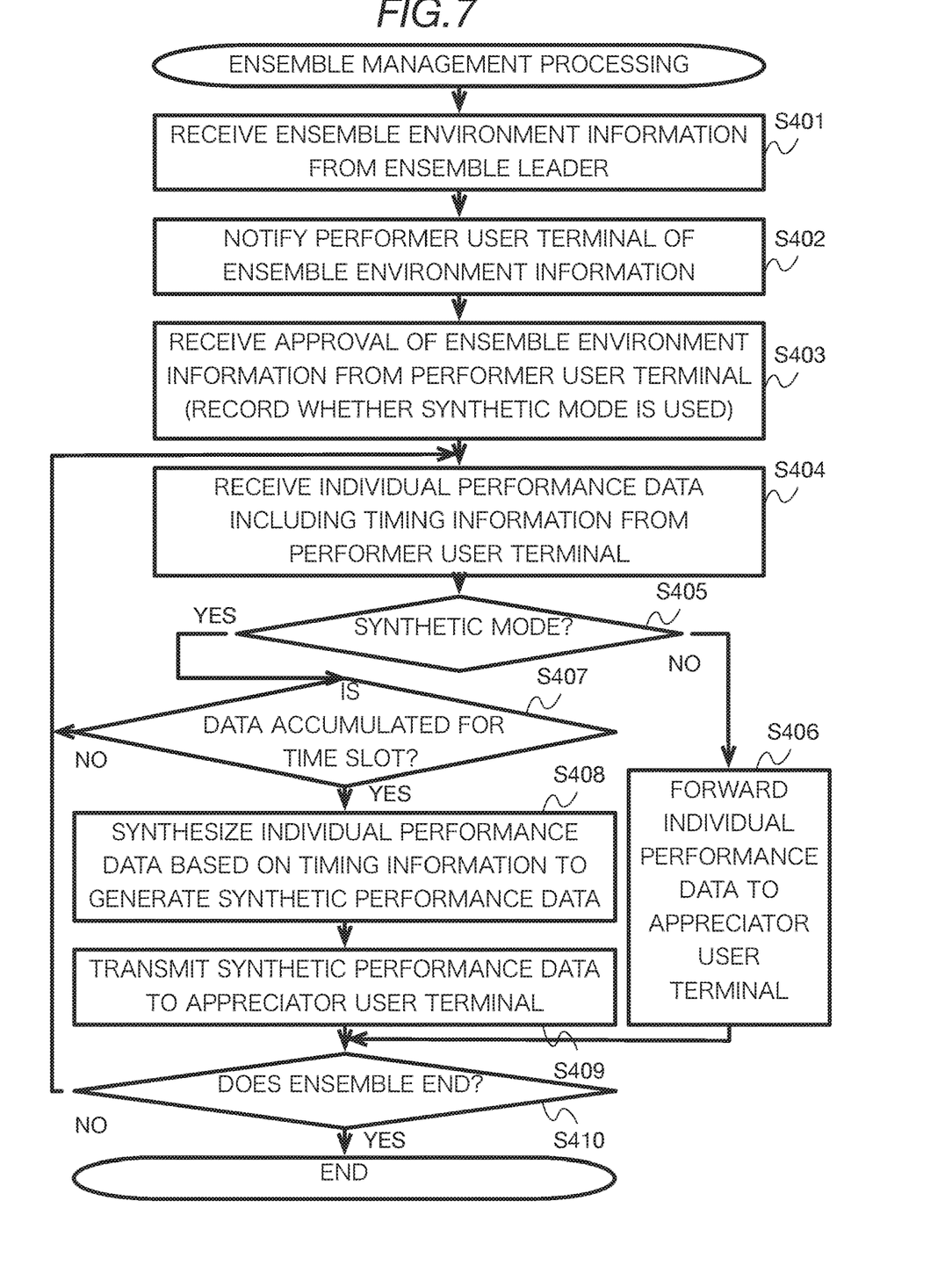
FIG. 7 is a flowchart illustrating a flow of ensemble management processing corresponding to at least one of the embodiments of the present disclosure.

FIG. 7 is a flowchart illustrating a flow of ensemble management processing according to the third embodiment. The processing illustrated in the flowchart is repeatedly performed by the server 1 in parallel with the game processing.

In steps S401 and S403, settings for an ensemble are performed. The server 1 receives the ensemble environment information transmitted from the performer user terminal 3 of the ensemble leader in step S302 of the individual performance processing (step S401). Then, the notification unit 24 of the server 1 transmits the received ensemble environment information to all the performer user terminals 3 in the party to which the source performer user terminal 3 that has transmitted the ensemble environment information belongs (all the in-party terminals that are ready for playing musical instruments) (step S402). Here, the ensemble environment information transmitted from the server 1 is received by all the performer user terminals 3 in the party in step S303 of the individual performance processing, and is approved or disapproved by the ensemble ready check. The server 1 receives the result of the ensemble ready check from each user terminal 3, and records the performer user terminal 3 (the user terminal 3 that uses the synthetic mode) that has approved the synthetic mode (step S403). After that, the processing proceeds to step S404.

In steps S404 and S405, the individual performance data is received, and it is determined whether or not the synthetic mode is applicable. The individual performance data reception unit 21 of the server 1 receives the individual performance data (individual performance packet) transmitted from each of the plurality of performer user terminals 3 (step S404). As described above, the individual performance data received here includes the content of the content of the received user's performance operation (pitch, volume of sound, length of sound, timing, tone, etc.).

When the individual performance data (individual performance packet) is received, the server 1 determines whether or not the source user terminal 3 that has transmitted the received individual performance data is a user terminal 3 that has approved the synthetic mode in the ensemble ready check. When the source user terminal 3 is a user terminal 3 that has approved the synthetic mode (YES in step S405), the processing proceeds to step S407. On the other hand, when the source user terminal 3 is a user terminal 3 that has not approved the synthetic mode (NO in step S405), the processing proceeds to step S406.

In step S406, the individual performance data is forwarded. The server 1 transmits the individual performance data (individual performance packet) received in step S404 to the appreciator user terminal 3 without synthesizing it with other individual performance data. Here, the appreciator user terminal 3 is a user terminal 3 that operates a player character in the vicinity (within a predetermined distance) of the player character related to the individual performance data in a game field. In this case, there is a possibility that the timing at which the individual performance data arrives at the appreciator user terminal 3 from the server 1 is advanced or delayed due to the transmission path and thus the accuracy of the ensemble at the appreciator user terminal 3 is reduced. Note that appreciator user terminals 3 may include a performer user terminal 3. After that, the processing proceeds to step S410.

In steps S407 to S409, synthetic performance data is generated and transmitted. The synthetic performance data generation unit 22 of the server 1 stands by for the pieces of individual performance data received from the respective performer user terminals 3 for a predetermined time slot (e.g., for one bar) to accumulate them (step S407). However, since the pieces of individual performance data accumulated here are synthesized during the performance and transmitted to the appreciator se terminal 3 as described below, a piece of individual performance data (individual performance packet) may be discarded that is not in time for the predetermined time slot because the transmission of the piece of individual performance data from the performer user terminal 3 to the server 1 is delayed more than expected.

When the standby for the predetermined time slot is completed, the synthetic performance data generation unit 22 synthesizes the pieces of individual performance data received in the time slot based on the timing information included in each piece of individual performance data (step S408). Specifically, the synthetic performance data generation unit 22 synthesizes the pieces of individual performance data to generate synthetic performance data so that sound corresponding to the performance operations is output at the correct timing of the ensemble (correct elapsed time from the start of the ensemble) according to the contents of the performance operations (pitch, volume of sound, length of sound, timing, tone, etc.) received from the performer user terminals 3. In order to output a plurality of sounds included in the synthetic performance data in the time slot associated with the synthetic performance data in the correct positional relationship and to reduce the load of data transmission to the appreciator user terminal 3, the synthetic performance data includes pieces of performance data for a predetermined number of units of time. For example, in the example of the present embodiment, the synthetic performance data is generated as data for one bar, and includes the contents of the performance operations within the bar (pitch, volume of sound, length of sound, timing, tone, etc.).

In addition, in the present embodiment, sound in a game field that is a three-dimensional virtual space is reproduced realistically by simulating the volume and/or quality of the sound depending on the distance between the sound generation point and the listening point (e.g., the position of the player character of the appreciator user terminal) and/or obstacles therebetween. Accordingly, in the present embodiment, each piece of performance data includes information indicating the position of the sound source (sound generation point) when the sound corresponding to the piece of performance data is reproduced in the game field. In the individual performance data, the sound source position is set to the position of the player character playing the performance, while in the synthetic performance data, the sound source position is set based on a preset rule because that data involves a plurality of player characters. For example, the sound source position of the synthetic performance data may be set to, for example, the position of the player character of the performance leader, the center of gravity of the positions of the plurality of player characters in the synthetic mode, or the positions of one or more player characters in the synthetic mode. Here, the position of the character is, for example, the position of the character's chest.

When the synthetic performance data is generated, the synthetic performance data transmission unit 23 of the server 1 transmits a synthetic performance packet including the generated synthetic performance data to the appreciator user terminal 3 (step S409). Here, the appreciator user terminal 3 is a user terminal 3 that operates a player character in the vicinity (within a predetermined distance) of a party participating in the synthetic mode in a game field. Appreciator user terminals 3 may include a performer user terminal 3. Note that, in order to avoid making the performance difficult to play due to the user's own performance arriving at the user with a delay, the performer user terminal 3 may be set not to receive the synthetic performance data (synthetic performance packet) from the server 1 or not to reproduce the synthetic performance data (synthetic performance packet), even when received from the server 1. After that, the processing proceeds to step S410.

In step S410, it is determined whether or not to continue the ensemble. When a predetermined end condition (e.g., reception of an instruction to leave the ensemble from the user terminal 3, or after a certain duration without receiving individual performance data from the user terminal 3) is satisfied (YES in step S410), the ensemble ends, and then the processing illustrated in the present flowchart ends. On the other hand, when the predetermined end condition is not satisfied (NO in step S410), the processing of steps S404 to S409 (receiving and synthesizing the individual performance packets, and distributing the synthetic performance packet) is repeatedly performed until the ensemble ends.

When the appreciator user terminal 3 receives the synthetic performance packet, the appreciator user terminal 3 reproduces the ensemble according to the synthetic performance data included in the packet. Specifically, the appreciator user terminal 3 receives as one packet the performance contents of the respective performer user terminals 3 for every predetermined time slot (in the present embodiment, for each bar), and reproduces the contents. This makes it possible to reproduce the pieces of performance data at an accurate timing as compared with a case where pieces of individual performance data generated by a plurality of user terminals 3 are received independently.

Figure 8:
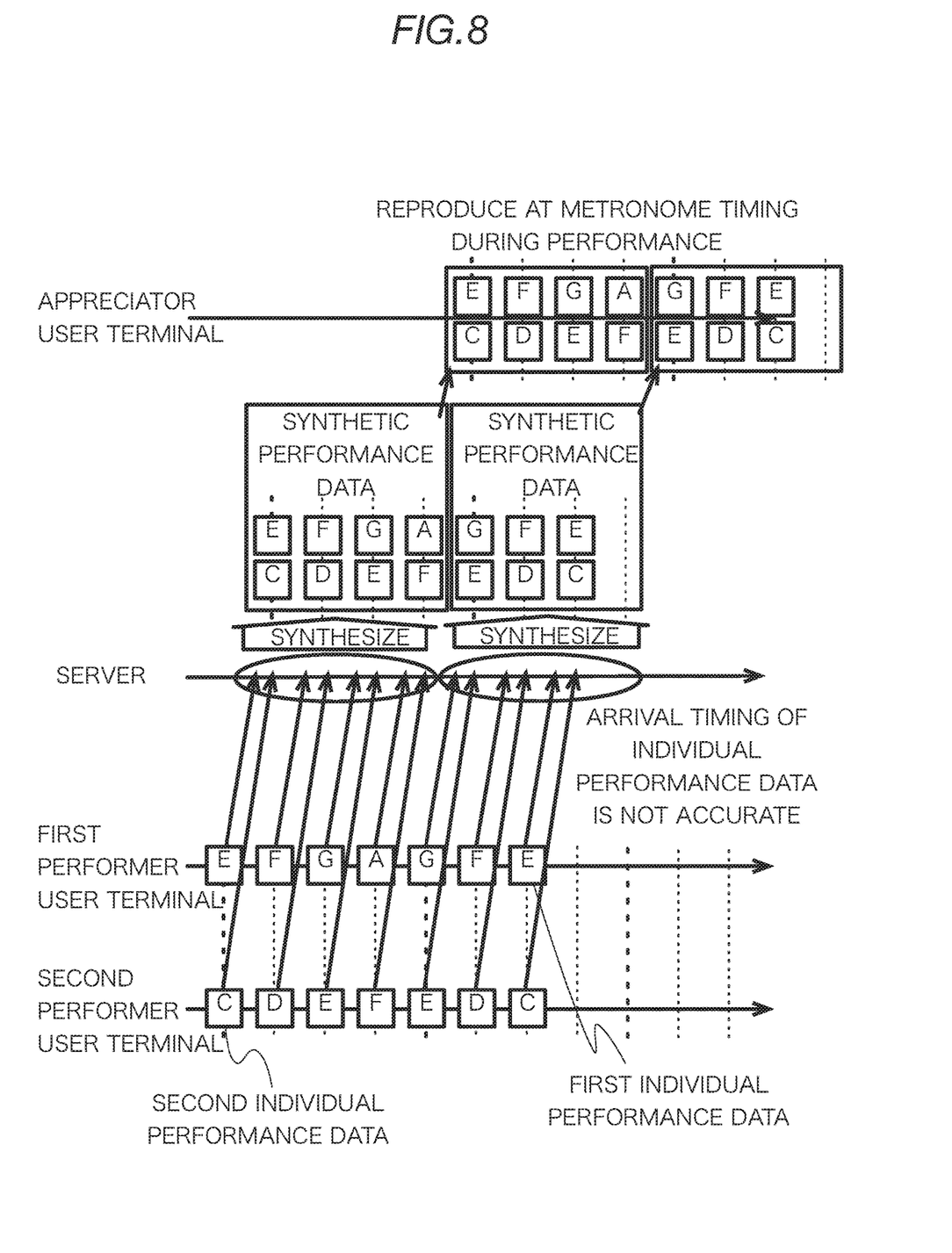
FIG. 8 is a diagram illustrating a flow of performance data according to at least one of the embodiments of the present disclosure.

FIG. 8 is a diagram illustrating a flow of performance data according to the third embodiment. In FIG. 8, an example will be described in which BEAT is set to "4" (i.e., four beats) and synthetic performance data is generated for each bar. The thick vertical broken lines in FIG. 8 represent the head of each bar, the thin vertical broken lines represent the head of each beat, and the letters written in frames of the individual performance data in FIG. 8 represent scales.

In a case where the in-game party includes a first performer user terminal 3 and a second performer user terminal 3, the first performer user terminal 3 generates and transmits, in real time in response to a performance operation by a first user, first individual performance data indicating the performance content of a first player character operated by the first user, and the second performer user terminal 3 generates and transmits, in real time in response to a performance operation by a second user, second individual performance data indicating the performance content of a second player character operated by the second user. Here, the timing at which the transmitted individual performance data arrives at the server 1 may deviate from the performance timing. Therefore, in the information processing system 9 according to the present embodiment, the first individual performance data and the second individual performance data are synthesized by the server 1 according to the timing of the metronome, so that synthetic performance data is generated to be reproduced as an ensemble played by the first player and the second player character on the appreciator user terminal 3. The generated synthetic performance data is transmitted to the appreciator user terminal 3 immediately after being generated, and is reproduced on the appreciator user terminal 3 at the timing of the metronome during the performance.

Note that since generation and transmission of the synthetic performance data and reproduction on the appreciator user terminal 3 are performed during the performance, the time from when the user actually performs a performance operation until the reproduction on the appreciator user terminal 3 is only "time during which the server stands by for the predetermined time slot to generate the synthetic performance data+processing delay time". Here, the processing delay time is a delay time associated with data generation, transmission, reproduction, and the like. Therefore, for example, even in a case where the predetermined time slot is set to a time corresponding to one bar, the appreciator user terminal 3 can appreciate the ensemble only with "the time corresponding to one bar+the processing delay time".

Other Variations

Each of the embodiments described above is an example in which the present disclosure is implemented, and does not limit the present disclosure to the specific configuration as described above. In implementing the present disclosure, a specific configuration according to the embodiment may be adopted as appropriate.

The above description of the third embodiment is for an example in which the metronome operates in each performer user terminal, but the performer user terminal may have no metronome. Further, although the description is also for an example in which the server uses the timing information transmitted from each performer user terminal to generate the synthetic performance data, the synthetic performance data may be generated without using the timing information. For example, when the synthetic performance data generation unit 22 of the server generates synthetic performance data based on pieces of individual performance data received in the predetermined time slot, the synthetic performance data generation unit 22 can use a shorter time slot (e.g., 0.1 seconds) to generate the synthetic performance data without using the timing information. In this case, there is a possibility that the timing at which the pieces of individual performance data arrive at the server from the respective performer user terminals is advanced or delayed due to the transmission path. However, since each piece of performance data does not need to include the timing information, the processing load is further reduced.

APPENDIX

The description of the embodiments described above has been described so that those having ordinary knowledge in the field to which the disclosure belongs can carry out the followings.

[1] A program causing a computer to function as:

an individual performance data receiver configured to receive a plurality of pieces of individual performance data from two or more performer user terminals connected via a network, each of the pieces of individual performance data being generated in accordance with a performance operation by a user on the corresponding performer user terminal and transmitted during a performance;

a synthetic performance data generator configured to generate synthetic performance data by synthesizing pieces of individual performance data in an identical time slot among the plurality of pieces of individual performance data received from the performer user terminals, during the performance, the synthetic performance data being used to reproduce sound in which individual performance contents on the two or more performer user terminals are mixed; and a synthetic performance data transmitter configured to transmit the synthetic performance data to at least one appreciator user terminal connected via the network during the performance.

[2] The program according to [1], wherein the individual performance data receiver receives first individual performance data serving as a performance content of a first player character operated by a first user in a computer game operating on a first performer user terminal, and second individual performance data serving as a performance content of a second player character operated by a second user in a computer game operating on a second performer user terminal, the synthetic performance data generator synthesizes the first individual performance data and the second individual performance data to generate the synthetic performance data, and the synthetic performance data transmitter transmits the synthetic performance data as data to be reproduced as an ensemble played by the first player character and the second player character in a computer game operating on the appreciator user terminal.

[3] The program according to [1] or [2], wherein the individual performance data receiver receives each piece of individual performance data including timing information for identifying a timing determined based on counting with a operating in the corresponding performer user terminal, and the synthetic performance data generator synthesizes the pieces of individual performance data in the identical time slot based on the timing information to generate the synthetic performance data.

[4] The program according to [1] or [2], wherein the synthetic performance data generator synthesizes the pieces of individual performance data received in the identical time slot to generate the synthetic performance data.

[5] The program according to [4], further causing the computer to function as a notifier configured to notify each of the performer user terminals of ensemble environment information for setting the metronome operating in each of the performer user terminals.

[6] The program according to any one of [1] to [5], the synthetic performance data generator synthesizes a plurality of pieces of individual performance data received from two or more performer user terminals included in a party created in advance.

[7] An information processing device comprising:

an individual performance data receiver configured to receive a plurality of pieces of individual performance data from two or more performer user terminals connected via a network, each of the pieces of individual performance data being generated in accordance with a performance operation by a user on the corresponding performer user al and transmitted during a performance;

a synthetic performance data generator configured to generate synthetic performance data by synthesizing pieces of individual performance data in an identical time slot among the plurality of pieces of individual performance data received from the performer user terminals, during the performance, the synthetic performance data being used to reproduce sound in which individual performance contents on the two or more performer user terminals are mixed; and a synthetic performance data transmitter configured to transmit the synthetic performance data to at least one appreciator user terminal connected via the network during the performance.

[8] An information processing system comprising a server and a plurality of user terminals which are connected via a network, wherein each of the plurality of user terminals includes an individual performance data generator configured to generate a plurality of pieces of individual performance data in accordance with a performance operation by a user; and an individual performance data transmitter configured to transmit the individual performance data to the server during a performance, and the server includes an individual performance data receiver configured to receive a plurality of pieces of individual performance data from two or more performer user terminals of the plurality of user terminals, each of the pieces of individual performance data being generated in accordance with a performance operation by a user on the corresponding performer user terminal and transmitted during a performance;

a synthetic performance data generator configured to generate synthetic performance data by synthesizing pieces of individual performance data in an identical time slot, of the plurality of pieces of individual performance data received from the performer user terminals, during the performance, the synthetic performance data being used to reproduce sound in which individual performance contents on the two or more performer user terminals are mixed; and a synthetic performance data transmitter configured to transmit the synthetic performance data to at least one appreciator user terminal of the plurality of user terminals during the performance.

[9] A method of causing a computer to execute:

receiving a plurality of pieces of individual performance data from two or more performer user terminals connected via a network, each of the pieces of individual performance data being generated in accordance with a performance operation by a user on the corresponding performer user terminal and transmitted during a performance;

generating synthetic performance data by synthesizing pieces of individual performance data in an identical time slot, of the plurality of pieces of individual performance data received from the performer user terminals, during the performance, the synthetic performance data being used to reproduce sound in which individual performance contents on the two or more performer user terminals are mixed; and transmitting the synthetic performance data to at least one appreciator user terminal connected via the network during the performance.

What is claimed is:

1. A non-transitory computer-readable recording medium having recorded thereon a program that, when executed, causes a computer to perform processing comprising:

receiving, at an individual performance data receiver, a plurality of pieces of individual performance data from two or more performer user terminals connected via a network, each piece of the individual performance data being generated in accordance with a performance operation by a user on the corresponding performer user terminal and transmitted during a performance;

generating, at a synthetic performance data generator, synthetic performance data during the performance by synthesizing first individual performance data among the individual performance data, the first individual performance data being received from one or more first terminals and being in an identical time slot, the first terminals being the performer user terminals which have approved a synthetic mode, wherein the synthetic performance data are to be used to reproduce sound in which individual performance contents on the two or more performer user terminals are mixed;

transmitting, from a synthetic performance data transmitter, the synthetic performance data to at least one appreciator user terminal connected via the network during the performance, wherein the transmitted synthetic performance data are to be reproduced at the appreciator user terminal during the performance; and transmitting second individual performance data among the individual performance data to the appreciator user terminal via the network during the performance, the second individual performance data being received from one or more second terminals and not being subject to synthesizing for generation of the synthetic performance data, the second terminals being the performer user terminals which have not approved the synthetic mode, wherein the second individual performance data are to be reproduced at the appreciator user terminal during the performance.

2. The non-transitory computer-readable recording medium according to claim 1, wherein the individual performance data receiver is configured to receive the individual performance data that includes:
a first performance content of a first player character operated by a first user in a computer game operating on a first performer user terminal; and
a second performance content of a second player character operated by a second user in the computer game operating on a second performer user terminal, and the synthetic performance data transmitter is configured to transmit the synthetic performance data that are to be reproduced as an ensemble at the appreciator user terminal, the ensemble including the first and second performance contents of the first and second player characters in the computer game operating on the appreciator user terminal.

3. The non-transitory computer-readable recording medium according to claim 1, wherein the individual performance data receiver is configured to receive each piece of the individual performance data including timing information for identifying a timing determined based on counting with a metronome operating in the corresponding performer user terminal during the performance, and synthetic performance data generator is configured to synthesize the first individual performance data in the identical time slot based on the timing information to generate the synthetic performance data.

4. The non-transitory computer-readable recording medium according to claim 1, wherein the synthetic performance data generator is configured to synthesize the first individual performance data received in the identical time slot to generate the synthetic performance data.

5. The non-transitory computer-readable recording medium according to claim 4, wherein the processing further comprises notifying, from a notifier, each of the performer user terminals of ensemble environment information for setting a metronome operating in each of the performer user terminals.

6. The non-transitory computer-readable recording medium according to claim 1, wherein the synthetic performance data generator is configured to synthesize the first individual performance data received from the first terminals among the performer user terminals included in a party created in advance.

7. An information processing device comprising:
a memory; and
a processor coupled to the memory, the processor being configured to
receive a plurality of pieces of individual performance data from two or more performer user terminals connected via a network, each piece of the individual performance data being generated in accordance with a performance operation by a user on the corresponding performer user terminal and transmitted during a performance;

generate synthetic performance data during the performance by synthesizing first individual performance data among the individual performance data, the first individual performance data being received from one or more first terminals and being in an identical time slot, the first terminals being the performer user terminals which have approved a synthetic mode, wherein the synthetic performance data are to be used to reproduce sound in which individual performance contents on the performer user terminals are mixed;

transmit the synthetic performance data to at least one appreciator user terminal connected via the network during the performance, wherein the synthetic performance data are to be reproduced at the appreciator user terminal; and transmit second individual performance data among the individual performance data to the appreciator user terminal, the second individual performance data being received from one or more second terminals and not being subject to synthesizing for generation of the synthetic performance data, the second terminals being the performer user terminals which have not approved the synthetic mode, wherein the second individual performance data are to be reproduced at the appreciator user terminal.

8. A method, comprising:
receiving a plurality of pieces of individual performance data from two or more performer user terminals connected via a network, each piece of the individual performance data being generated in accordance with a performance operation by a user on the corresponding performer user terminal and transmitted during a performance;

generating synthetic performance data during the performance by synthesizing first individual performance data among the individual performance data, the first individual performance data being received from one or more first terminals and being in an identical time slot, the first terminals being the performer user terminals which have approved a synthetic mode, wherein the synthetic performance data are to be used to reproduce sound in which individual performance contents on the performer user terminals are mixed;

transmitting the synthetic performance data to at least one appreciator user terminal connected via the network during the performance, wherein the synthetic performance data are to be reproduced at the appreciator user terminal; and transmitting second individual performance data among the individual performance data to the appreciator user terminal, the second individual performance data being received from one or more second terminals and not being subject to synthesizing for generation of the synthetic performance data, the second terminals being the performer user terminals which have not approved the synthetic mode, wherein the second individual performance data are to be reproduced at the appreciator user terminal.

9. The non-transitory computer-readable recording medium according to claim 2, wherein the processing further comprises transmitting one packet to the appreciator user terminal for every predetermined time slot, the one packet including the first and second performance contents to be reproduced as the ensemble at the appreciator user terminal.

10. The non-transitory computer-readable recording medium according to claim 5, wherein the metronome is synchronized among the performer user terminals.

11. The non-transitory computer-readable recording medium according to claim 1, wherein the processing further comprises:
   receiving ensemble environment information from an ensemble leader terminal, the ensemble environment information being set at the ensemble leader terminal; and
   transmitting the received ensemble environment information to the performer user terminals.

12. The non-transitory computer-readable recording medium according to claim 11, wherein the transmitted ensemble environment information are to be notified to the user at each of the performer user terminals.

13. The non-transitory computer-readable recording medium according to claim 11, wherein the ensemble environment information includes a setting for enabling the synthetic mode at each of the performer user terminals.

14. The non-transitory computer-readable recording medium according to claim 13, wherein the processing further comprises receiving approval of the synthetic mode from the performer user terminals.

15. The non-transitory computer-readable recording medium according to claim 11, wherein the ensemble environment information includes a setting for a metronome to be used for the ensemble.

16. The non-transitory computer-readable recording medium according to claim 1, wherein the processing further comprises:
   accumulating the first individual performance data received from the first performer user terminals for a predetermined time slot; and
   synthesizing the accumulated first individual performance data to generate the synthetic performance.

17. The non-transitory computer-readable recording medium according to claim 16, wherein the accumulated first individual performance data are synthesized based on timing information, the timing information being included in each piece of the first individual performance data.

* * * * *